(12) United States Patent
Sawada

(10) Patent No.: US 7,565,005 B2
(45) Date of Patent: Jul. 21, 2009

(54) THREE-DIMENSIONAL DATA PROCESSING METHOD, THREE-DIMENSIONAL DATA PROCESSING PROGRAM, AND THREE-DIMENSIONAL DATA PROCESSING SYSTEM

(75) Inventor: Yasuhiro Sawada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 899 days.

(21) Appl. No.: 10/781,211

(22) Filed: Feb. 17, 2004

(65) Prior Publication Data

US 2004/0169648 A1 Sep. 2, 2004

(30) Foreign Application Priority Data

Feb. 18, 2003 (JP) ............................. 2003-040412

(51) Int. Cl.
*G06K 9/00* (2006.01)

(52) U.S. Cl. .................. 382/154; 382/276; 345/419; 345/584; 356/603; 356/611

(58) Field of Classification Search ................. 345/419, 345/420, 426, 582, 584; 382/154, 276; 356/601, 356/602, 606, 609, 611, 622
See application file for complete search history.

(56) References Cited

U.S. PATENT DOCUMENTS

| | | | | |
|---|---|---|---|---|
| 5,566,283 A | * | 10/1996 | Modegi et al. | 345/426 |
| 5,592,246 A | * | 1/1997 | Kuhn et al. | 351/212 |
| 5,838,331 A | * | 11/1998 | DeBry | 345/584 |
| 5,949,424 A | * | 9/1999 | Cabral et al. | 345/426 |
| 5,974,168 A | * | 10/1999 | Rushmeier et al. | 382/141 |
| 6,075,540 A | * | 6/2000 | Hoppe | 345/419 |
| 6,151,118 A | * | 11/2000 | Norita et al. | 356/602 |
| 6,175,368 B1 | * | 1/2001 | Aleksic et al. | 345/582 |
| 6,205,243 B1 | * | 3/2001 | Migdal et al. | 382/154 |
| 6,226,006 B1 | * | 5/2001 | Collodi | 345/426 |
| 6,407,744 B1 | * | 6/2002 | Van Overveld | 345/584 |
| 6,434,442 B1 | * | 8/2002 | Kawamoto | 700/98 |
| 6,486,879 B1 | * | 11/2002 | Nagano et al. | 345/420 |
| 6,493,620 B2 | * | 12/2002 | Zhang | 701/45 |
| 6,509,902 B1 | * | 1/2003 | Pfister et al. | 345/582 |
| 6,532,075 B1 | * | 3/2003 | Edwards et al. | 356/609 |
| 6,614,446 B1 | * | 9/2003 | Van Overveld | 345/582 |
| 6,624,812 B1 | * | 9/2003 | Collodi | 345/426 |
| 6,664,956 B1 | * | 12/2003 | Erdem | 345/419 |
| 6,694,163 B1 | * | 2/2004 | Vining | 600/407 |

(Continued)

FOREIGN PATENT DOCUMENTS

JP 2000-348213 12/2000

OTHER PUBLICATIONS

SIGGRAPH 97, "Computer Graphics Proceedings", Aug. 3-8, 1997.

*Primary Examiner*—Gregory M Desire
(74) *Attorney, Agent, or Firm*—Rossi, Kimms & McDowell, LLP

(57) ABSTRACT

A three-dimensional data processing technique is disclosed which makes natural CG reproduction of a real existing object possible with as small a data amount and as small a calculation amount as possible. Three-dimensional data processing method, program, and system acquire first data showing at least one of a surface shape or taken images of a real existing object and generate a bump map for creating a three-dimensional image of the object based on the first data.

24 Claims, 11 Drawing Sheets

U.S. PATENT DOCUMENTS

| | | | |
|---|---|---|---|
| 6,744,442 B1 * | 6/2004 | Chan et al. | 345/587 |
| 6,803,910 B2 * | 10/2004 | Pfister et al. | 345/420 |
| 6,833,830 B2 * | 12/2004 | Collodi | 345/426 |
| 6,853,373 B2 * | 2/2005 | Williams et al. | 345/419 |
| 7,006,090 B2 * | 2/2006 | Mittring | 345/426 |
| 7,020,347 B2 * | 3/2006 | Zhang et al. | 382/276 |
| 7,079,680 B2 * | 7/2006 | Baumberg | 382/154 |
| 7,098,925 B1 * | 8/2006 | Lake et al. | 345/584 |
| 7,102,647 B2 * | 9/2006 | Sloan et al. | 345/584 |
| 7,120,289 B2 * | 10/2006 | Baumberg | 382/154 |
| 7,170,527 B2 * | 1/2007 | Sloan et al. | 345/584 |
| 7,200,262 B2 * | 4/2007 | Sawada | 382/154 |
| 7,408,550 B2 * | 8/2008 | Bunnell | 345/426 |
| 2001/0033685 A1 * | 10/2001 | Ishiyama | 382/154 |
| 2003/0001859 A1 * | 1/2003 | Sloan et al. | 345/584 |
| 2003/0071194 A1 * | 4/2003 | Mueller et al. | 250/208.1 |
| 2003/0146917 A1 * | 8/2003 | Dilliplane | 345/582 |
| 2004/0155879 A1 * | 8/2004 | Mittring | 345/426 |
| 2004/0169648 A1 * | 9/2004 | Sawada | 345/419 |
| 2005/0151751 A1 * | 7/2005 | Hong et al. | 345/582 |
| 2006/0119599 A1 * | 6/2006 | Woodbury | 345/420 |

* cited by examiner

THREE-DIMENSIONAL DATA PROCESSING METHOD, THREE-DIMENSIONAL DATA PROCESSING PROGRAM, AND THREE-DIMENSIONAL DATA PROCESSING SYSTEM

CROSS-REFERENCE TO RELATED APPLICATIONS

The present application claims priority under 35 U.S.C. §119 to Japanese Patent Application No. 2003-040412 filed on Feb. 18, 2003, the entire content of which being hereby incorporated herein by reference.

BACKGROUND OF THE INVENTION

1. Field of the Invention

The present invention relates to a three-dimensional image generating technique which obtains data necessary for generating a three-dimensional image of a real existing object by means of CG (computer graphics), and more specifically, a technique which adds a bump map to a three-dimensional shape model shown by a polygon mesh.

2. Description of Related Art

Conventionally, to reproduce a real existing object by means of CG, a method in which an image of the real existing object taken by a camera is pasted on the portions of a three-dimensional shape model has been used. In such a method, in order to cope with CG of various observing points, a plurality of images taken from a plurality of directions are prepared, and for reproduction, appropriate images are selected and pasted (refer to Japanese Patent Application Laid-Open No. 2000-348213).

However, by this method, images of an object to be reproduced by means of CG, illuminated under illumination conditions different from those when the object is imaged, cannot be obtained.

Furthermore, images taken by a camera originally include shades and highlights, so that an object pasted with the taken images becomes unnatural when it is provided with further shades and highlights.

Therefore, a method is employed in which a change in reflectance due to a light source direction or an observing direction is expressed as a reflection function, a numerical expression model is introduced for the reflection function, and a surface reflectance properties is indicated by reflection model constants (refer to "Object Shape and Reflectance Modeling from Observation:" SIGGRAPH Computer Graphics Proceedings, Annual Conference Series, pp379-387, 1997).

This method realizes reproduction of natural shades and highlights in optional illumination conditions and observing directions by use of comparatively slight surface reflectance properties information by holding reflection characteristics of colored portions provided on the surface of a three-dimensional shape model as reflection model constants, and when reproducing by substituting the constants into a reflection model function.

However, the abovementioned reflection model expresses light reflection and diffusion reflecting the surface structure at the micro level. Therefore, it cannot reflect fine shades due to unevenness that can be viewed, such as a stone surface, loosely woven cloth, and leathery crepe, etc. Of course, such unevenness can be expressed by a polygon mesh, however, in this case, the number of vertices and the number of polygons become enormous and result in a high operation processing burden, and this is not realistic.

On the other hand, in CG drawing, for drawing the abovementioned fine shades, a method called bump mapping is employed.

Generally, bump mapping is not concerned with shape drawing, but is used for shading by influencing normal directions at fine portions.

SUMMARY OF THE INVENTION

An object of the invention is to provide a three-dimensional data processing technique which realizes natural CG reproduction of a real existing object by a data amount and a calculation amount as small as possible.

In order to achieve the abovementioned object, according to one aspect of the three-dimensional data processing method, program, and system of the invention, first data showing at least one of a surface shape and taken images of a real existing object is acquired, and a bump map for generating a three-dimensional image of the object is generated based on the first data.

The characteristics of the invention will be clarified by the following detailed description of embodiments with reference to drawings.

DETAILED DESCRIPTION OF THE PREFERRED EMBODIMENTS

Hereinafter, the three-dimensional data processing technique of the invention is described with reference to the accompanying drawings.

Embodiment 1

Figure 1:
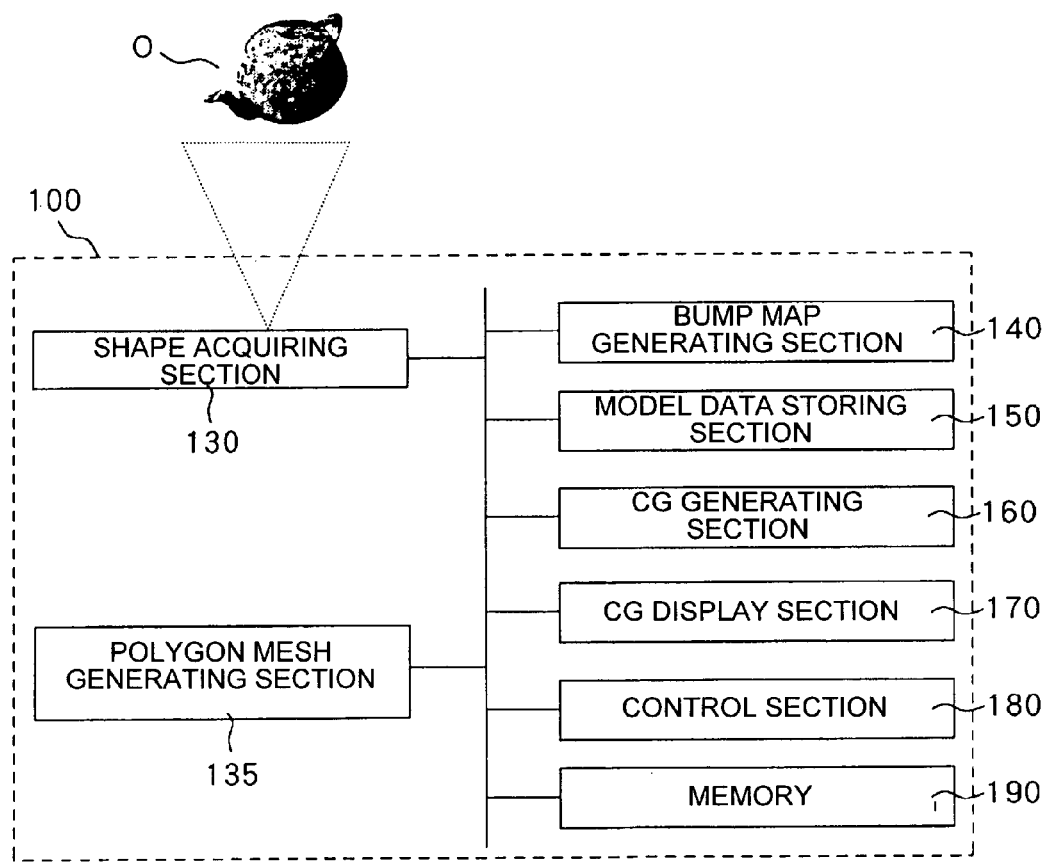
FIG. 1 is a block diagram showing the structure of a three-dimensional data processing system of Embodiment 1 of the invention.
Figure 2:
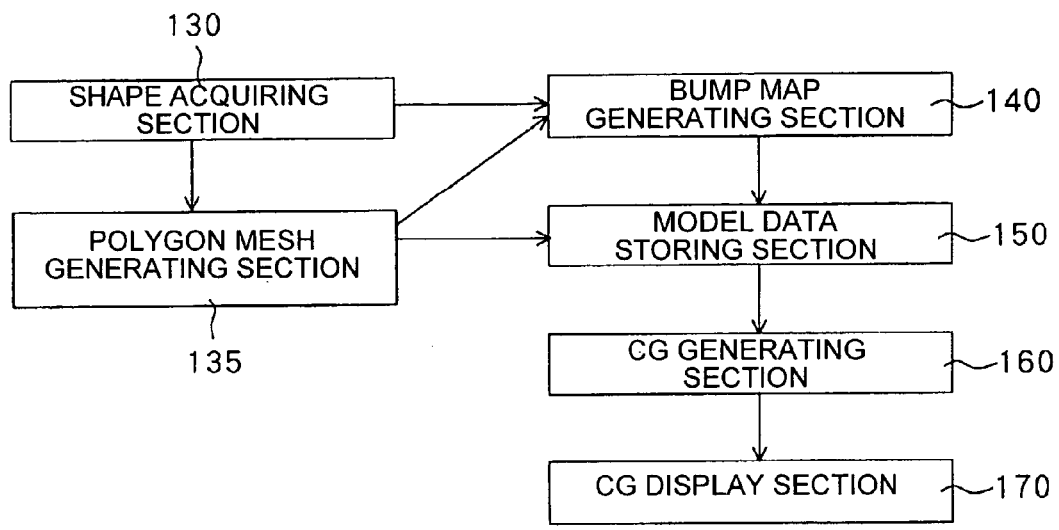
FIG. 2 is an explanatory view showing a flow of data in the three-dimensional data processing system of Embodiment 1.

FIG. 1 shows the structure of a three-dimensional data processing system 100 of Embodiment 1 of the invention, and FIG. 2 shows a flow of data among components of the three-dimensional data processing system 100 of FIG. 1.

The three-dimensional data processing system 100 of this embodiment comprises a shape acquiring section 130, a polygon mesh generating section 135, a bump map generating section 140, a model data storing section 150, a CG generating section 160, a CG display section 170, a control section 180, and a memory 190. Herein, as shown in FIG. 1, the respective sections of the three-dimensional data processing system are structured in a manner enabling them to exchange data via, for example, a bus interface, etc.

This three-dimensional data processing system 100 may be structured as one unit (computer), or may be structured by combining separate units. In this embodiment, description is given by assuming that the system is structured as one unit, however, the three-dimensional data processing system may be composed of, for example, a main unit comprising the shape acquiring section 130, the polygon mesh generating section 135, the bump map generating section 140, the model data storing section 150, the control section 180, and the memory 190, and a separate unit comprising the CG generating section 160 and the CG display section 170.

The shape acquiring section 130 acquires highly accurate three-dimensional shape data of an object O. The highly accurate three-dimensional shape data shows the surface shape of the object O, and shows three-dimensional coordinates of the respective surface portions of the object O. As this shape acquiring section 130, a three-dimensional shape acquiring apparatus such as a rangefinder or a three-dimensional scanner, etc., can be used.

Furthermore, the shape acquiring section 130 outputs a three-dimensional shape model shown by the acquired highly accurate three-dimensional shape data to the polygon mesh generating section 135 and the bump map generating section 140.

It is also possible that the shape acquiring section 130 is structured as a unit separate from the main unit, and highly accurate three-dimensional shape data acquired by this separate unit is stored in a recording medium such as a semiconductor memory, a magnetic disk, or an optical disk to make it possible to input (read) the data into the main unit. It is still also possible that the main unit has an input function of highly accurate three-dimensional shape data from such a storage medium and the shape acquiring section 130.

The polygon mesh generating section 135 generates a polygon mesh based on the highly accurate three-dimensional shape data input from the shape acquiring section 130. The polygon mesh shows the object's shape by using an assembly of line segments connected in a network pattern. Generation of the polygon mesh based on the highly accurate three-dimensional shape data is carried out according to a calculation method generally known. The polygon mesh generating section 135 outputs the generated polygon mesh to the bump map generating section 140 and the model data storing section 150.

Herein, the polygon mesh generating section 135 can control the level of complexity (the number of vertices and the number of polygons) of the polygon mesh to be generated, and an operator of this system can specify the level of complexity of the polygon mesh to be generated by considering the necessary accuracy, drawing speed and data size. Furthermore, the level of complexity specified in this embodiment shall be lower (that is, the shape is simpler) than the level of complexity of the highly accurate three-dimensional shape data.

The bump map generating section 140 generates a bump map on the basis of the highly accurate three-dimensional shape data input from the shape acquiring section 130 and the polygon mesh input from the polygon mesh generating section 135. The bump map is a distribution map including normal directions changed with fixed ordinality, and is used for fine shading. By ordinality differences on the bump map, it becomes possible to express different surface conditions such as a leathery surface, a metallic surface, and a ceramic surface, etc. The bump map generating section 140 outputs the generated bump map to the model data storing section 150. Detailed operations of the bump map generating section 140 are described later.

The model data storing section 150 stores the polygon mesh generated by the polygon mesh generating section 135 and the bump map generated by the bump map generating section 140. The model data storing section 150 can use various storage media, and the abovementioned memory 190 can be simultaneously used as the model data storing section 150. The model data storing section 150 can output the stored polygon mesh and bump map to the CG generating section 160.

The CG generating section 160 generates three-dimensional image data of the object O based on the polygon mesh and the bump map input from the model data storing section 150, in various observing points and illumination environments according to specification of an operator. Concretely, shape drawing by using the polygon mesh and shading by using the bump map are carried out.

Normal directions are necessary for this shading. On the other hand, the bump map generated by the bump map generating section 140 is positional displacement data. Normal fluctuations (relative normal directions) are obtained by differentiating the positional displacements along the polygon surfaces, and by calculating the differences between the normal fluctuations and the normal directions estimated from the polygon mesh, normal directions of respective texels of the bump map are obtained.

The CG display section 170 displays a three-dimensional image generated by the CG generating section 160. As this CG display section 170, various display apparatuses such as a CRT, an LCD, etc., can be used. Furthermore, as the CG display section 170, a printing unit such as a printer that can print image data may also be used.

The control section 180 comprises a processor such as a CPU or an MPU, and controls operations of the respective sections by using operation programs stored in the memory 190.

The memory 190 includes a nonvolatile memory such as an EEPROM which stores operation programs and various data necessary for processing of the three-dimensional processing system 100, and a volatile memory such as a RAM which temporarily stores image data and necessary control programs.

Figure 4:
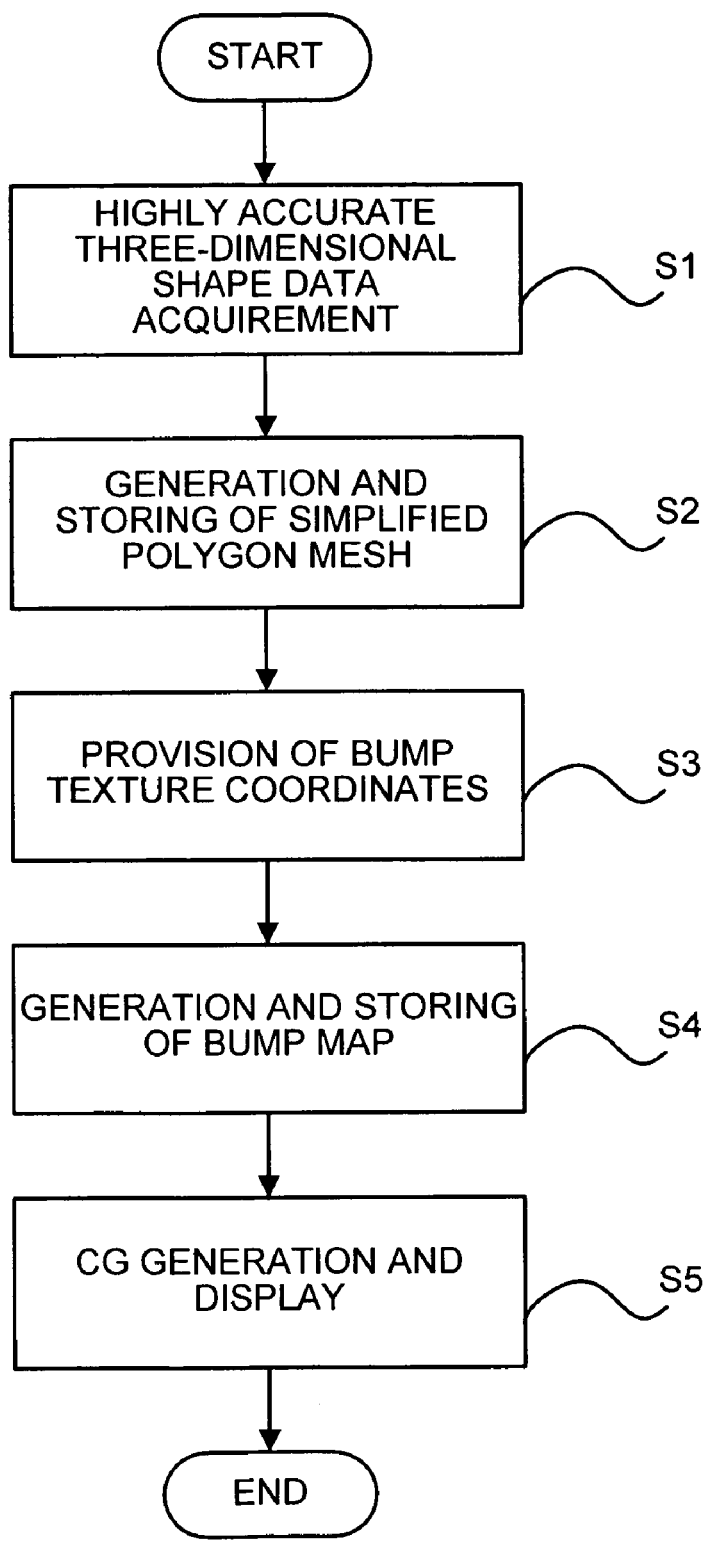
FIG. 4 is a flowchart showing operations of the three-dimensional data processing system of Embodiment 1.

Next, operations of the three-dimensional data processing system 100 structured as mentioned above (program operations under control of the control section 180) are described in detail with reference to the flowchart of FIG. 4. In FIG. 4 (and flowcharts of other figures), steps are abbreviated to "S."

(Step 1: Shape acquiring step)

The shape acquiring section 130 acquires highly accurate three-dimensional shape data by measuring the shape of the object O. The highly accurate three-dimensional shape data shows at least three-dimensional coordinates of measuring points optionally set at respective portions on the surface of the object O. Herein, the measuring points whose three-dimensional coordinates are shown are sufficiently large in number in comparison with the number of vertices of a polygon mesh to be generated by the polygon mesh generating section 135 later.

The shape acquiring section 130 outputs the acquired highly accurate three-dimensional shape data to the polygon mesh generating section 135 and the bump map generating section 140.

(Step 2, Step 3: Polygon mesh generating steps)

The polygon mesh generating section 135 converts the highly accurate three-dimensional shape data input from the shape acquiring section 130 into a polygon mesh. At this point, a polygon mesh simplified in shape complexity up to a level specified by an operator is generated.

As a detailed polygon mesh generating method (algorithm) herein, the method introduced in Hoops H. et al., "Mesh Optimization," Computer Graphics Proceedings SIGGRAPH '93 can be used. However, the polygon mesh generating method is not limited to this method, and other various methods can be used.

For each vertex of this simplified polygon mesh, bump texture coordinates that specify the position of bump map pasting are provided. Then, the polygon mesh provided with the bump texture coordinates is output to the bump map generating section 140 and stored in the model data storing section 150.

(Step 4: Bump map generating step)

The bump map generating section 140 sets texels adapted to the level of complexity of the polygon mesh input from the polygon mesh generating section 135. Furthermore, the bump map generating section 140 compares the highly accurate three-dimensional shape data input from the shape acquiring section 130 and the polygon mesh input from the polygon mesh generating section 135, calculates differences between these as displacements for respective texels, and outputs the displacements as a bump map to the model data storing section 150. The model data storing section 150 stores the bump map.

Figure 3:
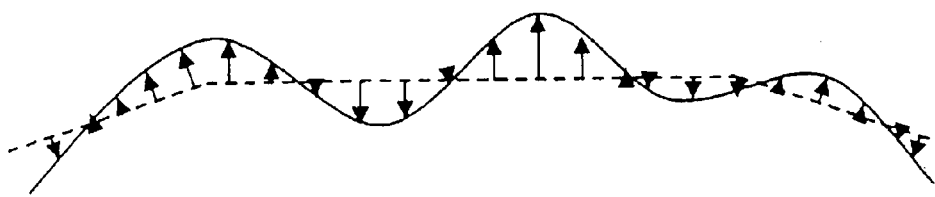
FIG. 3 is an explanatory view of a bump map generated in the three-dimensional data processing system of Embodiment 1.

Herein, FIG. 3 is an explanatory view showing the above-mentioned displacements. The solid line shows a piece of the shape shown by the highly accurate three-dimensional shape data, and the dotted line shows a piece of the shape shown by the polygon mesh. Texels exist on the polygon mesh, and from the respective texel positions, arrows indicating the displacements extend. The lengths of the arrows of the respective texels are output to and recorded on the model data storing section 150 as a bump map. Regarding the signs of the displacements, the sign is positive (meaning convex) when the corresponding arrow points to the outside of the polygon mesh (points up in FIG. 3) while the sign is negative (meaning concave) when the corresponding arrow points to the inside (points down in FIG. 3).

Thereby, the polygon mesh and the bump map necessary for CG reproduction of the object are stored in the model data storing section 150.

(Step 5: CG generating step)

For CG reproduction of the object O, the CG generating section 160 calculates the normal directions, illumination (incidence) directions, and image-taking (observing) directions of the respective texels based on layout information of the image-taking apparatus and the object and the illumination distribution in a virtual space required in the CG generating section 160 and the three-dimensional shape model (polygon mesh and bump map) stored in the model data storing section 150, and then calculates observation luminances. By drawing the observation luminances as display colors at display positions on the generated image, a three-dimensional image can be displayed on the CG display section 170.

When the normal directions are calculated, by taking the bump map into account in addition to the normals calculated from the polygon mesh, fine shades are also reproduced within the polygon.

As in this embodiment, based on highly accurate three-dimensional shape data, a simplified polygon mesh and a bump map which corresponds it are prepared separately, and these polygon mesh and bump map are handled as a pair of shape data for CG reproduction, etc., whereby a reproduced image (three-dimensional image) of an object having fine unevenness and shades can be obtained with a small data amount and a small calculation amount in comparison with the case where CG reproduction, etc., are realized by directly using the highly accurate three-dimensional shape data.

Embodiment 2

Figure 5:
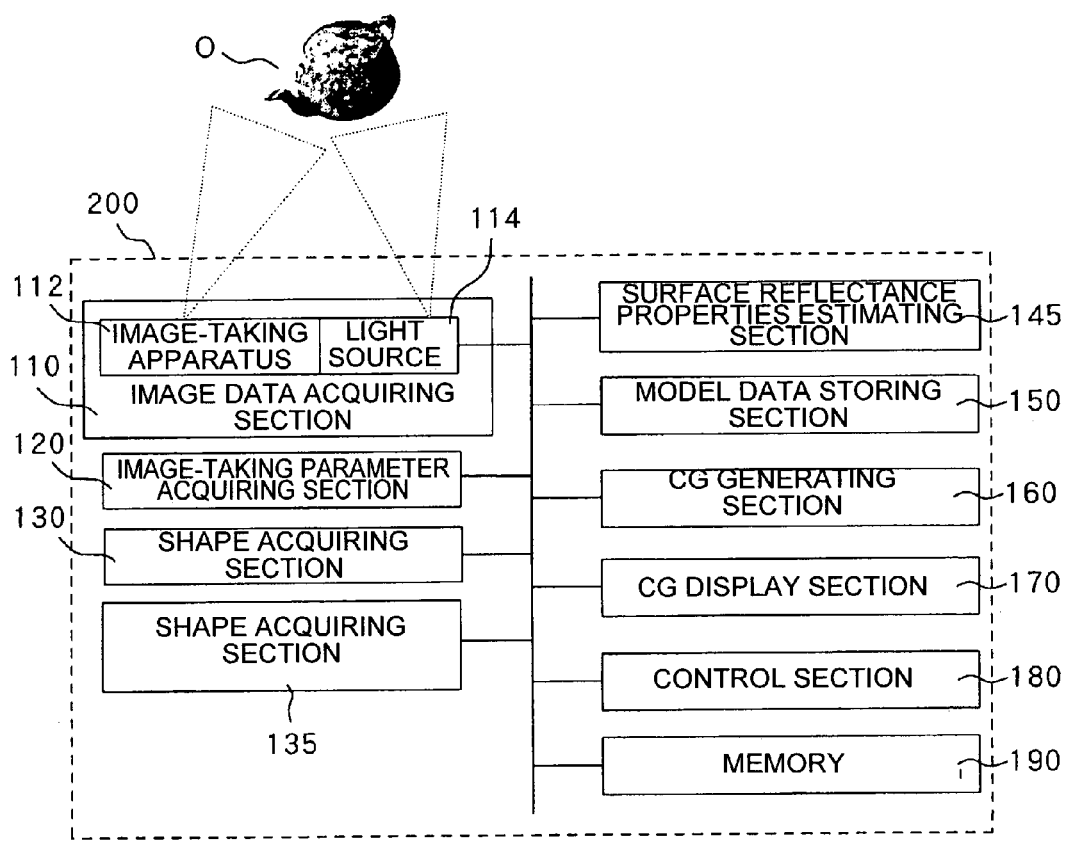
FIG. 5 is a block diagram showing the structure of a three-dimensional data processing system of Embodiment 2 of the invention.
Figure 6:
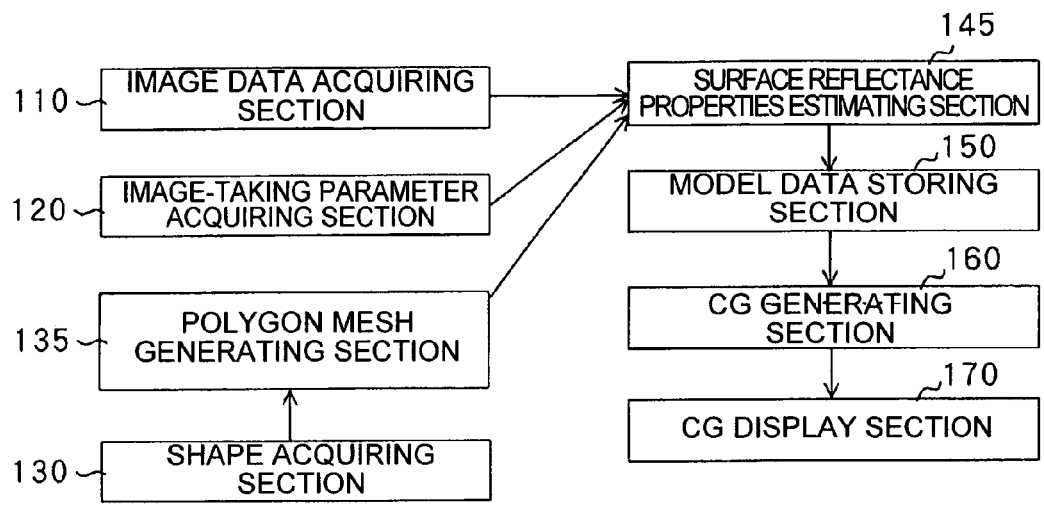
FIG. 6 is an explanatory view showing a flow of data in the three-dimensional data processing system of Embodiment 2.

FIG. 5 shows the structure of a three-dimensional data processing system 200 of Embodiment 2 of the invention. FIG. 6 shows a flow of data among components of the three-dimensional data processing system 200 shown in FIG. 5.

The three-dimensional data processing system 200 of this embodiment comprises an image data acquiring section 110, an image-taking parameter acquiring section 120, a shape acquiring section 130, a polygon mesh generating section 135, a surface reflectance properties estimating section 145, a model data storing section 150, a CG generating section 160, a CG display section 170, a control section 180, and a memory 190.

Herein, as shown in FIG. 6, the respective sections of the three-dimensional data processing system 200 are structured in a manner enabling them to exchange data via, for example, a bus interface, etc.

This three-dimensional data processing system 200 may be structured as one unit (computer), or may be composed of separate units. In this embodiment, description is given by assuming that the system is structured as one unit, however, it is also possible that the system is structured as a three-dimensional data processing system composed of a main unit comprising the image data acquiring section 110, the image-taking parameter acquiring section 120, the shape acquiring section 130, the polygon mesh generating section 135, the surface reflectance properties estimating section 145, the model data storing section 150, the control section 180, and the memory 190 and a separate unit comprising the CG generating section 160 and the CG display section 170.

The image data acquiring section 110 acquires taken image data of an object O. In this embodiment, the image data acquiring section 110 comprises an image-taking apparatus 112 and a light source 114. Namely, by taking images of the object O illuminated by light from the light source 114 by the image-taking apparatus 112, image data of the object O is acquired.

Figure 7:
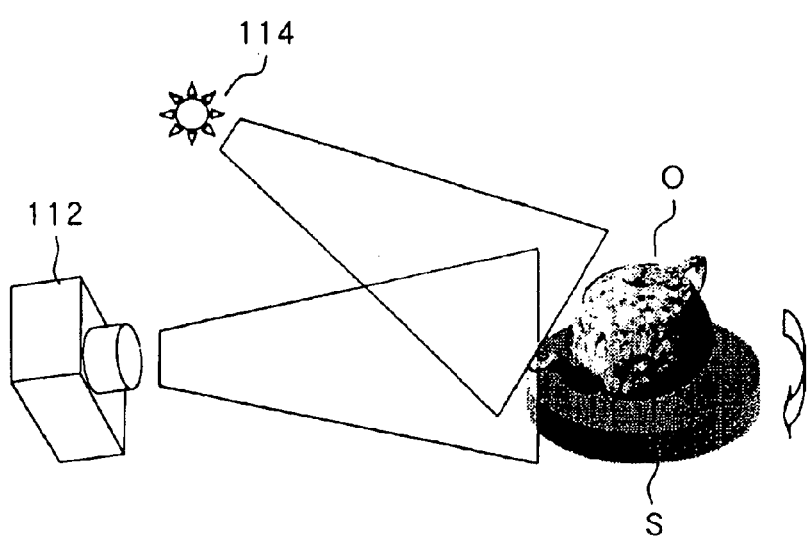
FIG. 7 is a schematic view showing an acquirement example of image data in the three-dimensional data processing system of Embodiment 2.

The image data acquiring section 110 acquires a plurality of images that are different in observing (image-taking) direction, light source (illuminating) direction, or posture (direction) of the object O. For example, as shown in FIG. 7, the object O is placed on a turntable S that is rotatable around an axis vertical to a surface on which the object O is placed, and the image-taking apparatus 112 and the light source 114 are changed in angle (that is, image-taking direction) to the object O from one direction independently or in synchronization with each other, whereby image-taking from a plurality of directions is realized.

The image-taking apparatus 112 and the light source 114 are fixed on, for example, a tripod, and their image-taking angles can be changed by changing the height of the tripod. However, it is also possible that the image-taking apparatus 112 and the light source 114 are connected to another moving mechanism that is not shown, and the moving mechanism is controlled by the control section 180, whereby the angles of the image-taking apparatus 112 and the light source 114 are automatically changed for image-taking.

As the image-taking apparatus 112, a digital still camera or a video camera can be used. The image-taking apparatus 112 produces image data composed of three R, G, and B color bands and outputs the data to the surface reflectance properties estimating section 145. As the light source 114, any of a point light source, a line light source, and a surface light source may be used.

Furthermore, the light source 114 is not necessarily an exclusive-use light source, and by providing an illumination environment measuring mechanism, a light source such as normal indoor illumination or sunlight, etc., can be used as the light source 114. In this case, measured illumination environment information is defined as light source information. For example, an orbit camera can be used as the illumination environment measuring mechanism.

Furthermore, in this embodiment, the object O is placed on the turntable S that is uniaxially rotatable, however, it is also possible that the object O is supported on an apparatus having a plurality of rotation axes. With such a structure, even when the image-taking apparatus 112 and the light source 114 are fixed at predetermined locations, image data on images of the object taken from a plurality of directions can be acquired. Furthermore, the system can also be structured so that the object O is fixed and the image thereof is taken while the position of the image-taking apparatus 112 or the light source 114 is changed, or image-taking is carried out while two or more parameters out of the position of image-taking apparatus 112, the position of the light source 114 and the posture of the object O are changed.

Furthermore, in this embodiment, description is given on the assumption that the image data acquiring section 110 is a component of the main unit, however, it is also possible that the image data acquiring section 110 is structured as a separate unit. In this case, image data obtained through image-taking is stored in a recording medium such as a semiconductor memory, a magnetic disk, or an optical disk, etc., so that inputting (reading-in) of the data into the main unit is made possible. Furthermore, a structure is also possible in which the main unit has both the input function of the image data from such a recording medium and the image data acquiring section 110.

The image-taking parameter acquiring section 120 acquires image-taking parameters for the image data in the image data acquiring section 110. In greater detail, the image-taking parameter acquiring section 120 acquires image-taking information including angles of view of the image-taking apparatus 112 and environment information in image-taking including the image-taking position (observing point) and luminance, position, and posture information of the object O and the light source 114. The image-taking parameter acquiring section 120 outputs acquired image-taking parameters to the surface reflectance properties estimating section 145.

The image-taking parameters may be directly input by an operator (including a person who took images or an operator of the three-dimensional data processing system 200) into the surface reflectance properties estimating section 145 via an input apparatus such as a keyboard. In this case, it is necessary that the abovementioned image data acquiring section 110 records layout of the image-taking apparatus 112, the light source 114, and the object O, the angle of view of the image-taking apparatus 112, and luminance information of the light source 114 in image-taking for each image to be acquired. Furthermore, in a case where the image data acquiring section 110 is controlled by the control section 180 and image-taking of the object O is automatically carried out, image-taking parameters for each image may be acquired by the control section 180.

Furthermore, it is also possible that the image-taking parameter acquiring section 120 is not provided and image-taking parameters stored in a recording medium such as a semiconductor memory, a magnetic disk, or an optical disk are read-in as data. It is still also possible that the reading-in function of image-taking parameters from such a recording medium and the image-taking parameter acquiring section 120 are simultaneously provided.

In addition, a part of the image-taking parameters may be estimated by the control section 180 from image data acquired by the image data acquiring section 110 in place of being recorded when images are taken. In this case, markers fixed on the object O are picked up in images together with the object O when the images are taken. When the object O has characteristic points that serve in place of the markers, the characteristic points may be used as the markers. Then, image-taking parameters are estimated from the positions and colors of the markers on taken images. An image-taking parameter estimating method is introduced in Chapter 6 of "Computer Vision" (Corona Corporation, 1999), however, other estimating methods can also be used.

The shape acquiring section 130 and the polygon mesh generating section 135 have the same function as in Embodiment 1. Namely, the shape acquiring section 130 acquires three-dimensional shape data of an object O by using a three-dimensional shape acquiring apparatus such as a rangefinder or a three-dimensional scanner, etc., and outputs the data to the polygon mesh generating section 135. Then, the polygon mesh generating section 135 generates a polygon mesh having a specified level of complexity based on the three-dimensional shape data input from the shape acquiring section 130 (or read-in from a recording medium).

In this embodiment, the shape acquiring section 130 outputs the three-dimensional shape data to only the polygon mesh generating section 135. In this embodiment, the three-dimensional shape data is used only for polygon mesh generation, and is not directly used for bump generation. Therefore, the shape measuring points are smaller in number than in Embodiment 1, and accordingly, a lower-accuracy three-dimensional shape acquiring apparatus can be used.

Furthermore, the shape acquiring section 130 may acquire three-dimensional shape data by means of a silhouette method from image data acquired by the image data acquiring section 110 (or read-in image data).

The polygon mesh generating section 135 outputs the generated polygon mesh to the surface reflectance properties estimating section 145 and the model data storing section 150.

Herein, it is possible that the shape acquiring section 130 and the polygon mesh generating section 135 are formed as separate apparatuses and inputting of three-dimensional shape data or a polygon mesh stored in a recording medium such as a semiconductor memory, a magnetic disk, or an optical disk, etc., into the main unit is made possible. Furthermore, the system can be structured so as to have the input function from such a recording medium, the shape acquiring section 130, and the polygon mesh generating section 135.

Based on the information input from the image data acquiring section 110, the image-taking parameter acquiring section 120, and the polygon mesh generating section 135, the surface reflectance properties estimating section (bump map generating part) 145 estimates surface reflectance properties information for each texel on a texture map to be pasted on the polygon mesh. Herein, surface reflectance properties mentioned in this embodiment includes a reflection model constant and a normal fluctuation of each texel. Detailed processing of the surface reflectance properties estimating section 145 is described later.

The surface reflectance properties estimating section 145 outputs the estimated surface reflectance properties information to the model data storing section 150.

The model data storing section 150 stores the polygon mesh generated by the polygon mesh generating section 135 and the surface reflectance properties of the respective texels estimated by the surface reflectance properties estimating section 145. A texture map recording normal fluctuations of the surface reflectance properties serves as a bump map.

Various storage media can be used as the model data storing section 150, or the abovementioned memory 190 can be simultaneously used as the data model storing section. The model data storing section 150 outputs the stored polygon mesh and information on surface reflectance properties to the CG generating section 160.

Furthermore, the functions of the CG generating section 160, the CG display section 170, the control section 180, and the memory 190 are the same as those in Embodiment 1.

Figure 8:
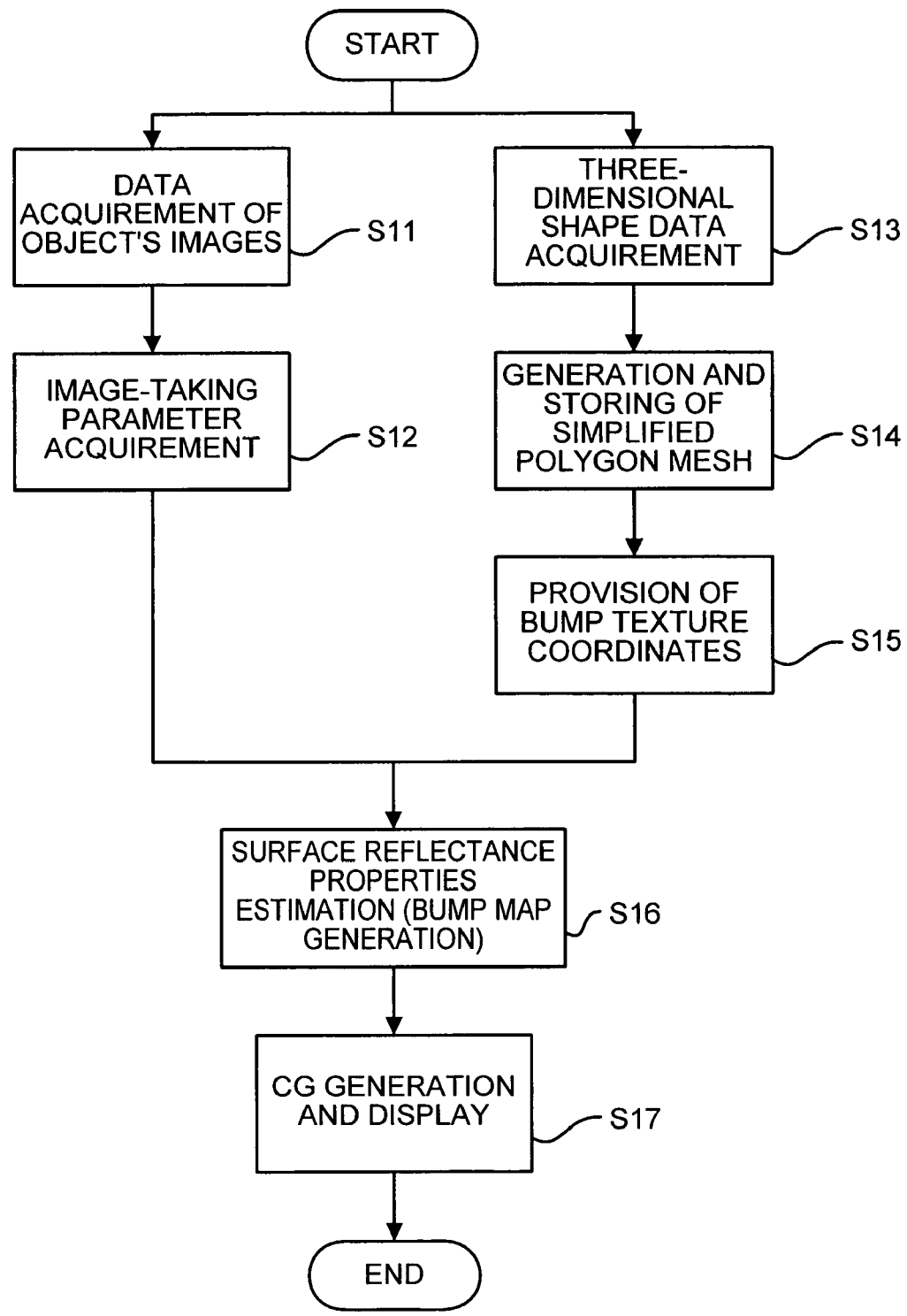
FIG. 8 is a flowchart showing operations of the three-dimensional data processing system of Embodiment 2.

Next, operations of the three-dimensional data processing system 200 of this embodiment (program operations under control of the control section 180) are described with reference to the flowchart of FIG. 8.

(Step 11: Image data acquiring step)

First, in the image data acquiring section 110, as shown in FIG. 7, the object O is placed on the turntable S and illuminated by the light source 114. At this point, the image-taking apparatus 112 is turned toward the object O. Then, images of the object are taken from a plurality of angles by the image-taking apparatus 112 while turning the turntable S to acquire image data composed of three R, G, and B color bands. Thereby, image data of images with changes in posture of the object O and relative differences in image-taking direction can be acquired. Furthermore, by changing the angle of the image-taking apparatus 112 or the light source 114 with respect to the object O, more image data can be obtained. The image data acquiring section 110 outputs these pieces of image data to the surface reflectance properties estimating section 145.

(Step 12: Image-taking parameter acquiring step)

In the image-taking parameter acquiring section 120, when image-taking is carried out, information on the image-taking apparatus 112 and the light source 114 and information on the positions and the postures of the image-taking apparatus 112 and the object O are acquired. Then, these pieces of information are output to the surface reflectance properties estimating section 145. Furthermore, as mentioned above, a part of the image-taking parameters may be estimated from image data in place of being recorded when image-taking is carried out.

(Step 13: Surface shape acquiring step)

The shape acquiring section 130 acquires three-dimensional shape data by measuring the shape of the object O. This three-dimensional shape data shows at least three-dimensional coordinates of measuring points optionally set at respective portions on the surface of the object O. Herein, the measuring points whose three-dimensional coordinates are shown are sufficiently large in number in comparison with the number of vertices of a polygon mesh to be generated by the polygon mesh generating section 135 later.

The shape acquiring section 130 outputs the acquired three-dimensional shape data to the polygon mesh generating section 135.

(Step 14, Step 15: Polygon mesh generating step)

The polygon mesh generating section 135 converts the three-dimensional shape data input from the shape acquiring section 130 into a polygon mesh. At this point, a polygon mesh that has been simplified in shape complexity up to the level specified by an operator is generated.

At the respective vertices of this simplified polygon mesh, texture coordinates that specify a pasting position of a texture map are provided. Then, the polygon mesh provided with the texture coordinates is output to the surface reflectance properties estimating section 145 and stored in the model data storing section 150.

The texture map mentioned herein includes bump map recording normal displacements of the respective texels and a reflection model constant map storing at least a part of the reflection model constants, and both of these have the same resolution and pasting position.

(Step 16: Surface reflectance properties estimating step)

Figure 9:
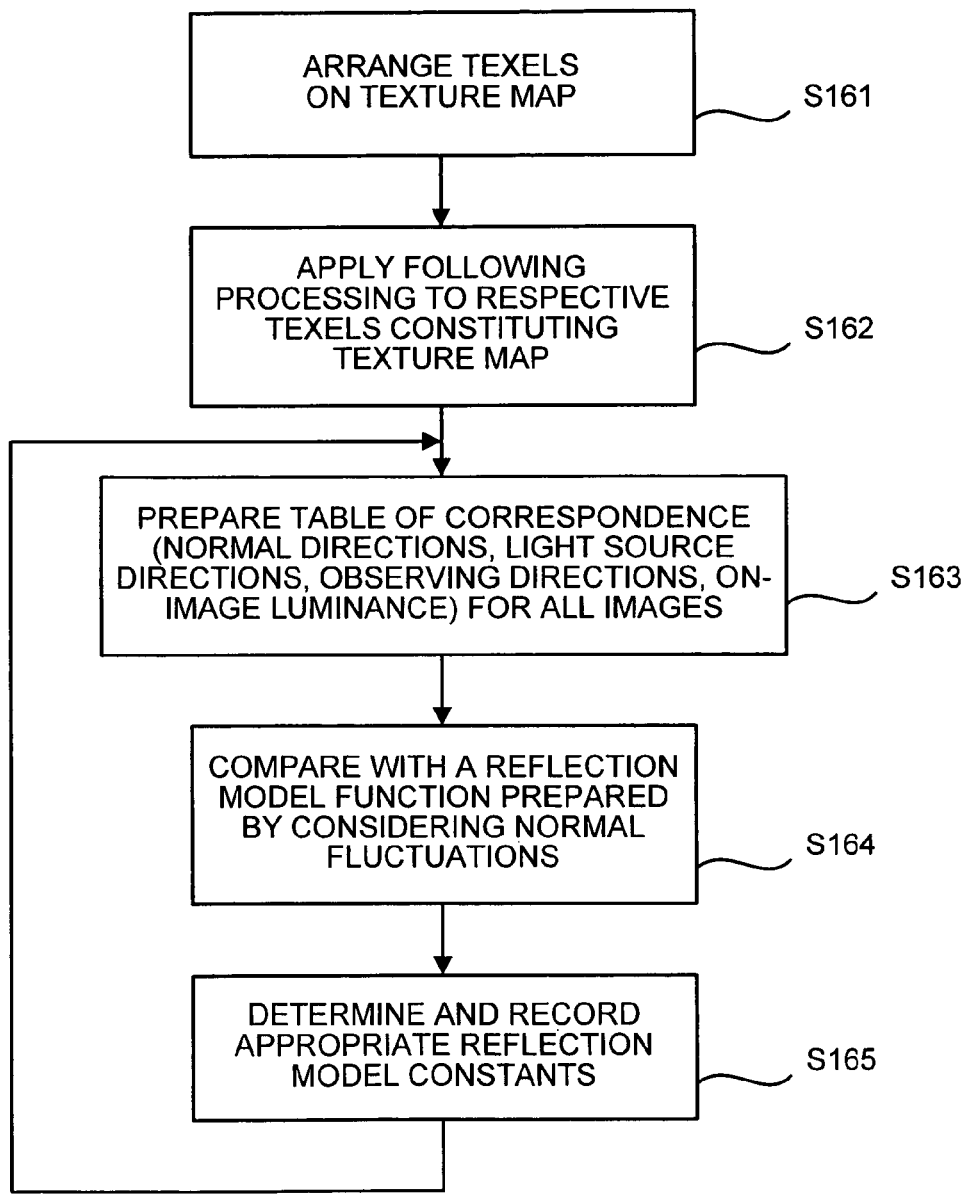
FIG. 9 is a flowchart showing a surface reflectance properties estimating operation in the three-dimensional data processing system of Embodiment 2.

In the surface reflectance properties estimating section 145, the surface reflectance properties of the object O are estimated on the basis of the input various pieces of information, and the obtained reflection model constants are stored in the model data storing section 150. Herein, the program operations of the surface reflectance properties estimating section 145 in this surface reflectance properties estimating step are described with reference to the flowchart of FIG. 9.

The surface reflectance properties estimating section 145 arranges texels with the specified resolution on the texture map (Step 161). This resolution is generally set to 2n×2n, and desirably, set to be substantially equivalent to the occupation size of the image data pixels on the surface of the object O. However, the resolution is not limited to this. Then, the following processing is repeated for each texel (Step S162).

Figure 10:
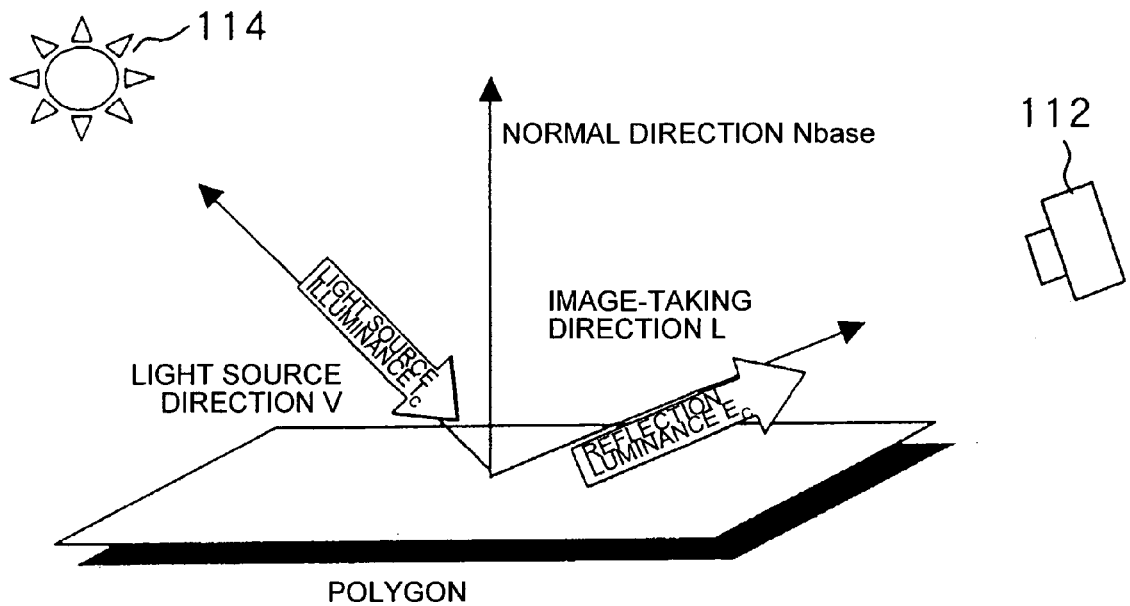
FIG. 10 is a conceptual diagram showing surface reflectance properties estimation in the three-dimensional data processing system of Embodiment 2.

First, as shown in FIG. 10, for all pieces of image data that have been taken by the abovementioned image-taking method and are different in posture of the object O, image-taking direction and illumination direction, the normal direction vector $N_{base}$, the light source direction vector L, the light source illuminance $I_c$, the observing direction vector V, and the on-image luminance (reflection luminance) $E_c$ estimated from the polygon mesh in one texel are calculated, and a table of correspondence is created (Step S163).

Herein, the subscript "C" of the light source illuminance I and the on-image luminance E shows a color band, and generally, C={R, G, B}.

The normal direction, the light source direction, and the observing direction can be calculated from the image-taking parameters and the polygon mesh. Namely, from information on the postures and layout of the image-taking apparatus 112, the light source 114, and the object O and the polygon mesh at the time of image-taking, the normal direction, the observing direction, the light source direction, and the position on the image of each texel are calculated. Then, the luminance can be obtained from the image.

Furthermore, in a case where the on-image luminance is unknown since the texel is on the back surface of the image, behind another portion, or outside the image, it is excluded from the table of correspondence.

Next, this table of correspondence is substituted into the reflection model function $BRDF_{parms}(N; V, L)$ which is determined by considering the illumination distribution (Step 164). For example, when a Phong reflection model shown in Formula (1) is used as a reflection model function, the reflection model constant "parms" becomes:
$\{Cd_R, Cd_G, Cd_B, C_S, n\}$ $$BRDF_{parms}(N; V, L) = Cd_C(N \cdot L) + C_S(V \cdot L)n \quad (1)$$

Formula (1) is equivalent to Formula (2) indicated by tangential coordinates using N as the z axis.

$$BRDF'_{parms}(V', L') = Cd_C L'z + C_S(V', L')n \quad (2)$$

Herein, V' and L' are expressions of V and L in a tangential coordinate system, and L'z is a z component of L'.

Figure 11:
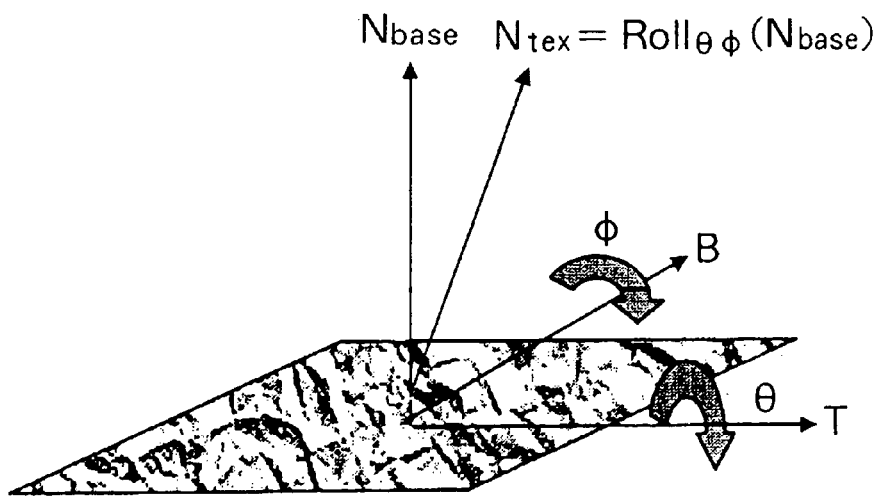
FIG. 11 is an explanatory view of Roll θφ(N).

Herein, when the normal on a texel is further defined as $N_{tex}$ and an operation $Roll_{\theta\phi}(N)$ to rotate the vector N shown in FIG. 11 around the axis of the tangential vector T of the polygon by $\theta$ and around the axis of another tangential vector B orthogonal to the T axis by $\phi$ is introduced, the relationship of Formula (3) is obtained.

$$Ecj = I_C BRDF_{parms}(N_{tex} = Roll_{\theta\phi}(N_{base}j); Vj, Lj) + \epsilon_C j \quad (3)$$

Herein, $\epsilon$ shows an error, and the subscript j shows an image number.

Then, a combination of constants which makes the abovementioned error optimum:
$\{Cd_R, Cd_G, Cd_B, C_S, n, \theta, \phi\}$
is determined, and reflection model constants of the texel:
$(Cd_R, Cd_G, Cd_B, C_S, n)$
and the normal fluctuation $(\theta, \phi)$ are defined, and these are stored in (recorded on) the model data storing section 150 (Step 165).

For the abovementioned optimization, various mathematical methods can be used. For example, in a case where the least-squares method is used, the evaluation function is defined as the sum of squares of the error $\epsilon_C j$ as shown in Formula (4), and a combination of the constants which minimizes this evaluation function are determined.

$$f(Cd_R, Cd_G, Cd_B, Cs, n, \theta, \phi) = \sum_j^p (\varepsilon_{Rj}^2 + \varepsilon_{Gj}^2 + \varepsilon_{Bj}^2) \quad (4)$$

where, P denotes each image of the table of correspondence.

The abovementioned evaluation function f handles all errors equivalently, however, it is also possible that an evaluation function set by considering the reliabilities of the respective values is set.

Furthermore, in the above explanation, the light source is set at only one point in the V direction, however, in a case where a plurality of light sources exist or a light source is not a point light source but has expansion on the celestial sphere, the light source distribution is defined as $I_C(L)$ and Formula (5) that is an integral expression of these light sources is applied in place of Formula (3).

$$B_C J = \int^R I_C(Lj) BRDF_{parms}(N_{tex} = Roll_{\theta\phi}(N_{base}j), Vj, Lj) \, dLj + \epsilon_C j \quad (5)$$

where, R denotes Region including light sources distributed.

Thereby, complete model data necessary for CG reproduction of the object O is prepared in the model data storing section 150. The normal fluctuations obtained for each texel form a bump map.

(Step 17: CG generating step)

For reproducing the object O by means of CG, the CG generating section 160 calculates the normal directions, the illumination (incidence) directions, and the image-taking (observing) directions of each texel based on the layout information of the image-taking apparatus and the object and the illumination distribution in a virtual space required in the CG generating section 160, and the polygon mesh and the surface reflectance properties data (including the bump map) stored in the model data storing section 150, and substitutes these into the reflection model function to calculate the observation luminances. By drawing the observation luminances as display colors at display positions on a generated image, a three-dimensional image can be displayed on the CG display section 170.

When calculating the normal directions, by considering the bump map in addition to the normals calculated from the polygon mesh, fine shades can be reproduced in a polygon.

Furthermore, although the case where the image data is composed of three colors of R, G, and B has been described in this embodiment, the image data may be composed of a single color, other colors, spectral information, or image of polarized light as long as it can describe a corresponding reflection model function.

Furthermore, although the case using a Phong reflection model as the reflection model function has been described in the abovementioned embodiment, another reflection model function may be used. For example, a reflection model function of a Lambert model, a Blinn model, or a Torrance-Sparrow model, etc., can also be used as long as a reflectance is provided from the relationship between one or a plurality of reflection model constants and the normal direction, the light source direction, and the observing direction.

Moreover, the reflection model function that can be used in this embodiment is a bidirectional reflection distribution function which provides a reflectance by using at least the light source direction and the observing direction in the tangential coordinate system as arguments, and is a numerical expression having reflection model constants as elements.

The reflection model function that can be used in this embodiment is a dichroic reflection model expressed by a linear combination of diffuse reflection components and specular reflection components. In this case, reflection model constants may be roughly divided into two groups of diffuse reflection model constants concerning diffuse reflection components and specular reflection model constants concerning specular reflection components.

Then, the reflection model constants and the normal directions or normal fluctuations constituting the bump map are set to a combination of values that most accurately reproduce measured luminance changes determined from image data when the light source directions (illumination directions) and the observing directions (image-taking directions) determined from image-taking parameters are applied to the reflection model function.

In an estimating method of the surface reflectance properties estimating section 145, reflection model constants and normal displacements are not always uniquely determined in all texels. However, such a problem can be solved by complement from reflection constants of a texel near the texel having constants that cannot be determined or substitution of typical values.

Although the normal fluctuations of texels are stored in the model data storing section 150. Further, it is possible that a bump map in the abovementioned embodiment, it is also possible that normal directions are determined from differences between the normal fluctuations and normal directions estimated from the polygon mesh, and are stored as a bump map in the data storing section 150, or displacements that are differences between the positions estimated from the polygon mesh and the positions on the three-dimensional shape are determined and stored as a bump map in the data storing section 150. To convert a normal fluctuation into a displacement, the fact that the displacement z and the normal fluctuation (θ, ρ) satisfy the relationship of the following Formula (6) is utilized.

$$\tan(\theta) = \frac{dz}{dB}, \tan(\phi) = \frac{dz}{dT} \quad (6)$$

From Formula (6), a restriction of Formula (7) is obtained.

$$rot\ grad\ z = rot\begin{pmatrix} \tan(\theta) \\ \tan(\theta) \end{pmatrix} = \frac{d\tan(\theta)}{dT} - \frac{d\tan(\phi)}{dB} = 0 \quad (7)$$

Herein, T and B are unit vectors of tangential line directions of the polygon mesh orthogonal to each other.

When estimating the normal fluctuations, the estimation accuracy can be improved by considering the restriction of Formula (7).

In the abovementioned embodiment, in the surface reflectance properties estimating section 145, a case where the surface reflectance properties are estimated at the same resolution as that in recording on the model data storing section 150 has been described, however, it is also possible that the surface reflectance properties are estimated at higher resolutions in the surface reflectance properties estimating section 145 and the resolutions are converted into a specified resolution by being averaged among texels when the attributes are stored in the model data storing section 150. Further, it is possible that noise influence is suppressed by carrying out processing such as applying a low pass filter in the tangential line directions when storing in the model data storing section 150.

In this embodiment, surface reflectance properties information including a bump map is estimated and generated not from shape data but from shades of image data of an object, so that high accuracy and high measuring point density are not required for shape acquirement. Therefore, a three-dimensional data processing apparatus can be realized by using a comparatively simple three-dimensional shape acquiring apparatus in the shape acquiring section 130.

Embodiment 3

Next, a three-dimensional data processing system of Embodiment 3 of the invention is described. The system structure of this embodiment is similar to that of Embodiment 2 shown in FIG. 5 and FIG. 6, however, operations of the surface reflectance properties estimating section 145 are different from those in Embodiment 2, so that the operations of the surface reflectance properties estimating section 145 are described herein.

In this embodiment, the surface reflectance properties estimating section 145 estimates surface reflectance properties information of each texel on the basis of information input from the image data acquiring section 110, the image-taking parameter acquiring section 120, and the polygon mesh generating section 135. Herein, the surface reflectance properties information mentioned in this embodiment includes a surface reflectance properties index and a normal fluctuation of each texel. The surface reflectance properties estimating section 145 outputs estimated surface reflectance properties information to the data model storing section 150.

Figure 12:
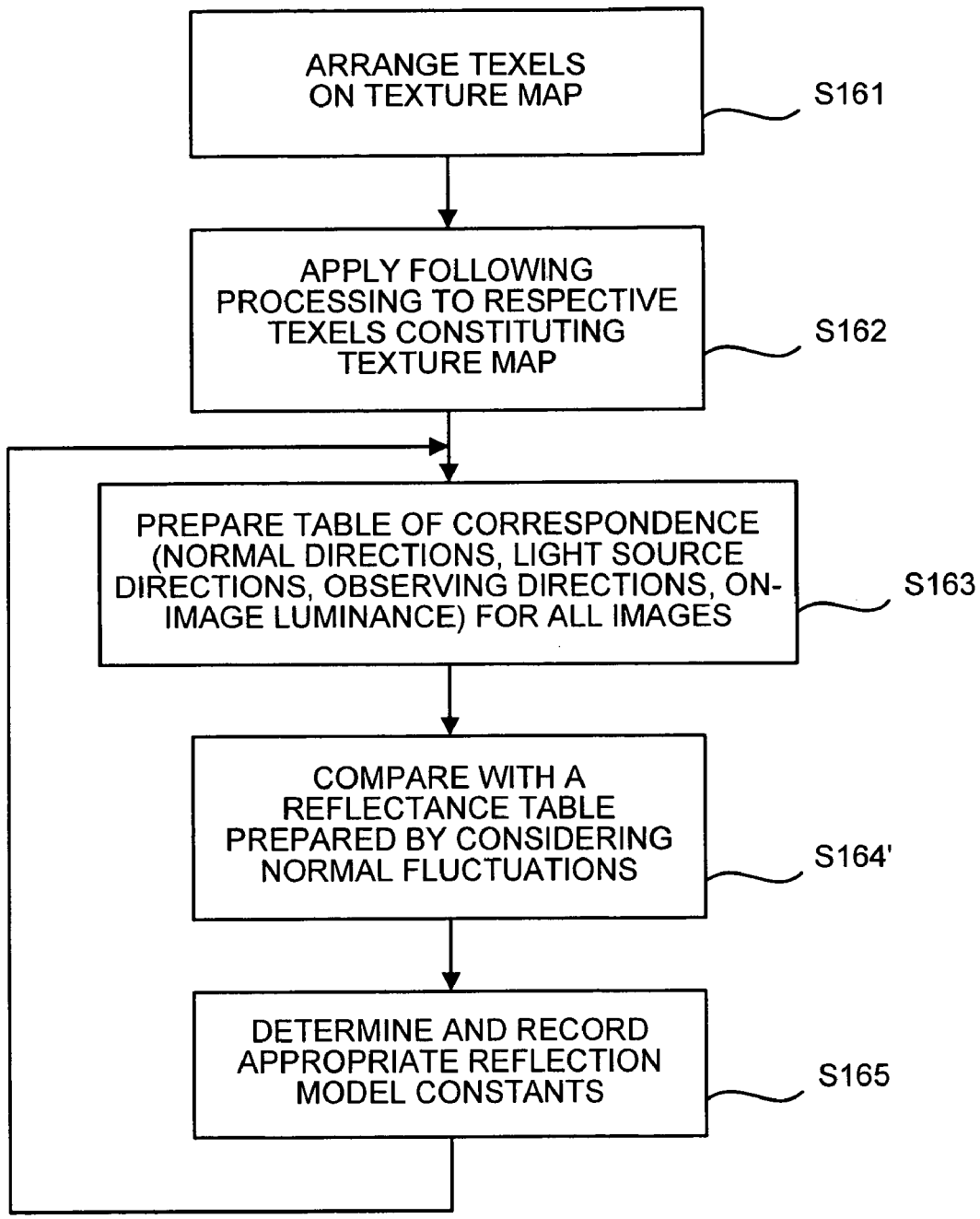
FIG. 12 is a flowchart showing a surface reflectance properties estimating operation in a three-dimensional data processing system of Embodiment 3 of the invention.

The program operations of the surface reflectance properties estimating section 145 are described with reference to the flowchart of FIG. 12. Operations of Step 161, Step 162, and Step 163 are the same as in Embodiment 2.

In Step 164', a correspondence table prepared in Step 163 is compared with samples in a surface reflectance properties list in order. The surface reflectance properties list is a reflectance table TABLE' k(V', L') indicating a series of reflectances with respect to the light source directions L' and observing directions V' in the tangential coordinate systems using normal directions as z axes in various samples k.

When a converting formula into a tangential coordinate system defining a normal as N is assumed to be V'=trans (N; V), this reflectance table TABLE' k(V', L') can be expressed as Formula (8).

$$TABLEk(N; V, L) = TABLE'k(V' = trans(N; V), L' \quad (8)$$

$$= trans(N; L)$$

Furthermore, the normal on a texel is defined as $N_{tex}$, and an operation $Roll_{\theta\phi}(N)$ that rotates the vector N around the axis of the tangential line vector T of the polygon by θ and around the axis of another tangential vector B orthogonal to the T axis by φ is introduced, and regarding an image luminance when the surface reflectance properties of the texel is sample number k, the relationship shown by Formula (9) is obtained.

$$E_{cj}=I_C TABLEk(N_{tex}=Roll_{\theta\phi}(Nbasej); Vj, Lj)+\epsilon_{cj} \quad (9)$$

where, ε shows an error, and the subscript j shows an image number.

Then, a sample number k to correct the error to an optimum value is determined, and is stored in the model data storing section 150 as the surface reflectance properties index k and the normal fluctuation (θ, φ).

Thereby, complete model data necessary for reproducing the object by means of CG is collected in the model data storing section 150.

In this embodiment, the surface reflectance properties is obtained not as a reflection model constant but as an index indicating one within the list, so that when the surface reflectance properties of the object are limited to several types, stable estimation can be carried out.

Embodiment 4

Figure 13:
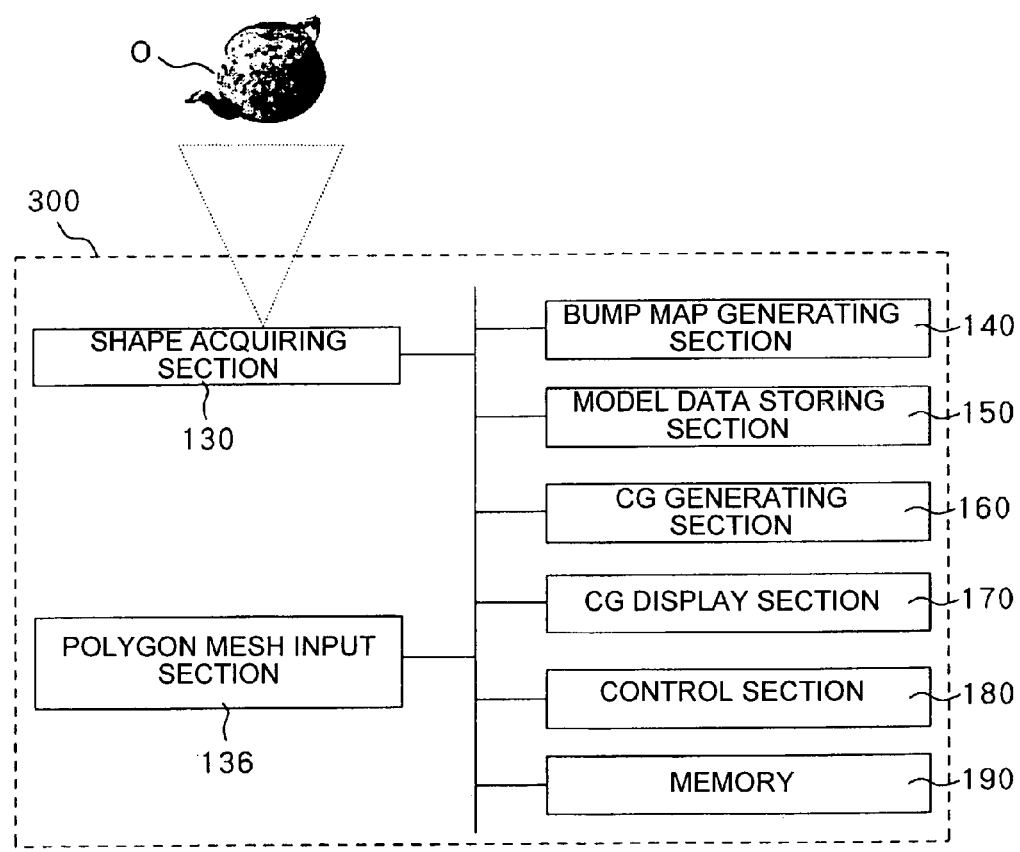
FIG. 13 is a block diagram showing the structure of a three-dimensional data processing system of Embodiment 4 of the invention.
Figure 14:
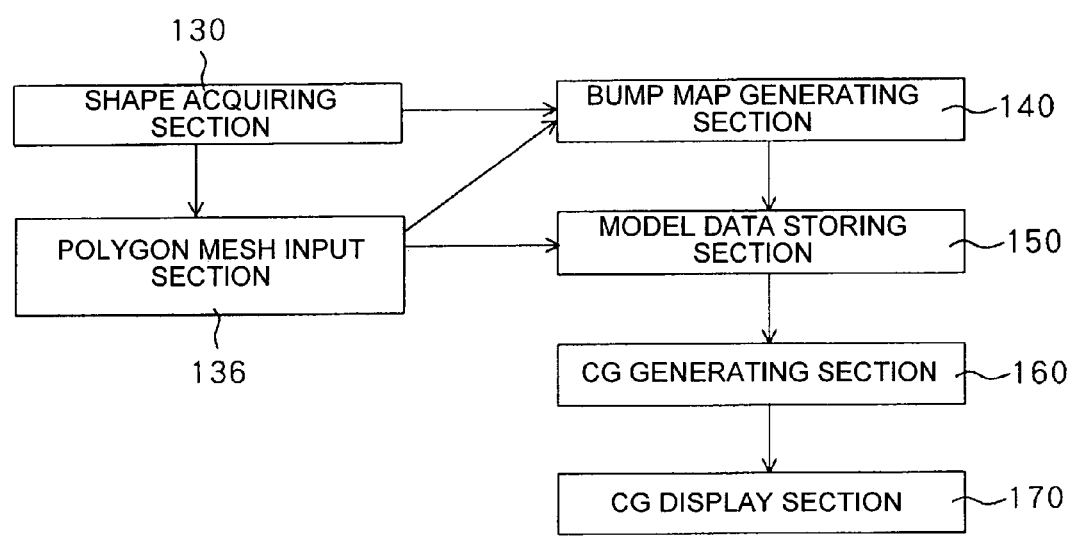
FIG. 14 is an explanatory view showing a flow of data in the three-dimensional data processing system of Embodiment 4.

FIG. 13 shows the structure of a three-dimensional data processing system 300 of Embodiment 4 of the invention, and FIG. 14 shows a flow of information among components of the three-dimensional data processing system 300.

The three-dimensional data processing system 300 of this embodiment comprises a shape acquiring section 130, a polygon mesh input section 136, a bump map generating section 140, a model data storing section 150, a CG generating section 160, a CG display section 170, a control section 180, and a memory 190.

Furthermore, the functions of the shape acquiring section 130, the bump map generating section 140, the model data storing section 150, the CG generating section 160, the CG display section 170, the control section 180, and the memory 190 are the same as those in Embodiment 1. Operations of the system are almost the same as those described in the flowchart of FIG. 4 in Embodiment 1. However, in the present embodiment, in place of the polygon mesh generating section 135 of Embodiment 1, the polygon mesh input section 136 is provided. Step 2 in the flowchart of FIG. 4 serves as a polygon mesh input step.

The polygon mesh input section 136 acquires a polygon mesh to be used for three-dimensional data generation of an object O. Concretely, in Step 2 of the flowchart of FIG. 4, the polygon mesh input section reads-in information on the polygon mesh that has been processed by another apparatus and stored in a recording medium such as a semiconductor memory, magnetic disk, or optical disk, or receives information on the polygon mesh through wireless or wired communications lines from the another apparatus that processes the polygon mesh.

The polygon mesh input section 136 can controls the level of complexity of the polygon mesh. When the input polygon mesh has complexity different from a required level of complexity, the polygon mesh input section 136 increases or lowers the level of complexity of the polygon mesh so that the level agrees with the required level of complexity.

Furthermore, when the polygon mesh is not provided with the bump texture coordinates, the polygon mesh input section 136 provides to the polygon mesh.

In a case where reference coordinate systems are different between the highly accurate three-dimensional shape data input from the shape acquiring section 130 and the polygon mesh, the polygon mesh input section 136 converts the coordinates of the polygon mesh or the highly accurate three-dimensional shape data so that the coordinate systems agree with each other. The polygon mesh thus optimized is output from the bump map generating section 140 and stored in the model data storing section 150. Then, as in Embodiment 1, a three-dimensional image is generated and displayed by using the polygon mesh and the bump map stored in the model data storing section 150.

In this embodiment, it becomes possible that a common basic polygon mesh for expressing, for example, faces of persons is prepared, and the shapes of individual faces of the persons are generated as different bump maps on the basic polygon mesh. Thereby, when face data of a plurality of persons is held, only one polygon mesh is held, and therefore, the data amount can be saved.

Even when special processing such as morphing of a certain person's face into another person's face is carried out, only the bump map is processed without changing the polygon mesh, and this simplifies the processing.

Furthermore, in each embodiment mentioned above, as a method of obtaining data (three-dimensional shape data, image data, polygon mesh data, etc.) necessary for generating a bump map, any other method can be used in addition to the methods described in each embodiment.

Furthermore, it is also possible that a higher accurate three-dimensional image is obtained by combining the method of generating a bump map based on surface shape data and the method of generating a bump map based on taken image data described in the respective embodiments mentioned above.

As described above, according to the embodiments mentioned above, based on surface shape data or taken image data of a real existing object, a bump map expressing fine unevenness of the object surface can be generated, so that a three-dimensional image of the object having fine shades based on the surface unevenness can be reproduced with a small data amount and calculation amount.

While preferred embodiments have been described, it is to be understood that modification and variation of the present invention may be made without departing from scope of the following claims.

What is claimed is:

1. A three-dimensional data processing program embodied on a computer-readable medium, the program comprising steps of:
   acquiring three-dimensional image data and three-dimensional shape data of taken images of a real existing object;
   generating a polygon mesh based on the three-dimensional shape data of taken images of the real existing object;
   estimating surface reflectance properties of the real existing object based on the three-dimensional image data obtained at the acquiring step and the polygon mesh generated at the generating step thereby generating a bump map; and
   reproducing image of the real existing object with a computer graphic based on the polygon mesh generated at the generating step and the bump map generated at the estimating step.

2. The three-dimensional data processing program according to claim 1, wherein the surface reflectance properties includes data on constants in a reflection model function and data on normal direction constituting the bump map.

3. The three-dimensional data processing program according to claim 1, wherein the surface reflectance properties is data specifying a specific reflectance from a reflectance table which shows a series of reflectances corresponding to light source directions and image-taking directions in tangential coordinate systems, and includes data on normal directions constituting the bump map.

4. The three-dimensional data processing program according to claim 1, further comprising:
   acquiring the polygon mesh that shows a simplified shape of the surface shape of the object,
   wherein in the estimating step, surface reflectance properties of the object are estimated by using the polygon mesh acquired in the acquiring the polygon mesh step and parameters of image-taking of the object.

5. The three-dimensional data processing program according to claim 4, wherein the bump map shows amounts of positional changes of respective texels on a texture map to be pasted on the polygon mesh with respect to the polygon mesh.

6. The three-dimensional data processing program according to claim 4, wherein the bump map shows normal directions of respective texels on a texture map to be pasted on the polygon mesh.

7. The three-dimensional data processing program according to claim 4, wherein the bump map shows differences between normal directions of respective texels on a texture map to be pasted on the polygon mesh and normal directions of the polygon mesh.

8. The three-dimensional data processing program according to claim 4, wherein in the acquiring the polygon mesh step, the polygon mesh is generated based on the image data.

9. The three-dimensional data processing program according to claim 4, wherein in the acquiring the polygon mesh step, an input of data for the polygon mesh is received.

10. The three-dimensional data processing program according to claim 4, wherein in the acquiring the polygon mesh step, a polygon mesh having one of a vertex number according to information on a specified vertex and polygon number according to information on a specified polygon number is generated.

11. The three-dimensional data processing program according to claim 4, wherein in the acquiring the polygon mesh step, bump texture coordinates which specify a pasting position of the bump map are provided for the respective vertices of the polygon mesh.

12. The three-dimensional data processing program according to claim 1, wherein in the estimating step, the bump map is generated so that an area of each texel on the bump map becomes substantially equivalent to an area where one pixel of the image data occupies on a surface of the object.

13. The three-dimensional data processing program according to claim 1, wherein in the estimating step, the bump map having a texel number according to information on a specified resolution of the bump map resolution is generated.

14. The three-dimensional data processing program according to claim 1, wherein in the estimating step, the bump map is generated so as to have a normal distribution satisfying a condition that a rotation of vector value of each texel becomes zero.

15. The three-dimensional data processing program according to claim 1, further comprising:
   an image generating step in which a three-dimensional image of the object is generated by using the bump map generated in the estimating step, and
   an image output step in which the generated three-dimensional image is output.

16. A three-dimensional data processing system comprising:
   a computer which executes a three-dimensional data processing program according to claim 1.

17. A three-dimensional data processing system comprising:
   a data acquiring section which acquires three-dimensional image data and three-dimensional shape data of taken images of a real existing object; and
   a generating section which generates which generates a polygon mesh based on the three-dimensional shape data of taken images of the real existing object;
   an estimating section which estimates surface reflectance properties of the real existing object based on the three-dimensional image data obtained at the acquiring section and the polygon mesh generated at the generating section thereby generating a bump map; and
   a reproducing section which reproduces image of the real existing object with a computer graphic based on the polygon mesh generated at the generating section and the bump map generated at the estimating section.

18. The three-dimensional data processing system according to claim 17, wherein the surface reflectance properties includes data on constants in a reflection model function and data on normal directions constituting the bump map.

19. The three-dimensional data processing system according to claim 17, wherein the surface reflectance properties is data specifying a specific reflectance from a reflectance table which shows a series of reflectances corresponding to light source directions and image-taking directions in tangential coordinate systems, and includes data on normal directions constituting the bump map.

20. The three-dimensional data processing system according to claim 17,
   wherein the generating section generates the polygon mesh that shows a simplified shape of the surface shape of the object, and
   the estimating section estimates the surface reflectance properties of the object by using the polygon mesh generated by the generating section and data showing parameters of image-taking of the object.

21. The three-dimensional data processing system according to claim 17, wherein the estimating section generates the bump map so that an area of each texel on the bump map becomes substantially equivalent to an area where one pixel of the image data occupies on a surface of the object.

22. The three-dimensional data processing system according to claim 17, wherein the estimating section generates the bump map having a texel number according to information on a specified resolution of the bump map.

23. The three-dimensional data processing system according to claim 17, wherein the estimating section generates the bump map so as to have a normal distribution satisfying a condition that a rotation of vector value of each texel becomes zero.

24. The three-dimensional data processing system according to claim 17, further comprising:
   an image generating section which generates a three-dimensional image of the object by using the bump map generated by the estimating section, and
   an image output section which outputs the generated three-dimensional image.

* * * * *